United States Patent
Oliveira et al.

(10) Patent No.: US 7,255,245 B2
(45) Date of Patent: Aug. 14, 2007

(54) HYBRID PRESSURE VESSEL WITH SEPARABLE JACKET

(75) Inventors: Tiago Oliveira, Porto (PT); Joao Carlos V. Antunes Guimaraes, Braga (PT); Eduardo J. Alves, Porto (PT)

(73) Assignee: Amtrol Inc., West Warwick, RI (US)

( * ) Notice: Subject to any disclaimer, the term of this patent is extended or adjusted under 35 U.S.C. 154(b) by 8 days.

(21) Appl. No.: 11/115,992

(22) Filed: Apr. 25, 2005

(65) Prior Publication Data

US 2005/0269338 A1 Dec. 8, 2005

Related U.S. Application Data

(60) Provisional application No. 60/564,776, filed on Apr. 23, 2004.

(51) Int. Cl.
*F17C 1/02* (2006.01)

(52) U.S. Cl. .................. 220/586; 220/630; 220/649

(58) Field of Classification Search ............... 220/581, 220/584, 588, 589, 592, 586, 630, 647, 648, 220/649, 650
See application file for complete search history.

(56) References Cited

U.S. PATENT DOCUMENTS

| | | | |
|---|---|---|---|
| 3,843,010 A | 10/1974 | Morse et al. | |
| 4,225,051 A | 9/1980 | Faudou et al. | |
| 4,360,116 A | 11/1982 | Humphrey | |
| 4,653,663 A | 3/1987 | Holtsclaw | |
| 4,905,856 A | 3/1990 | Krogager | |
| 4,925,044 A | 5/1990 | Hembert | |
| 5,025,943 A | 6/1991 | Forsman | |
| 5,253,778 A | 10/1993 | Sirosh | |
| 5,287,988 A | 2/1994 | Murray | |
| 5,385,262 A | 1/1995 | Coquet et al. | |
| 5,476,189 A | 12/1995 | Duvall et al. | |
| 5,494,188 A | 2/1996 | Sirosh | |
| 5,518,141 A | 5/1996 | Newhouse et al. | |
| 5,673,794 A | 10/1997 | Kuipers et al. | |
| 5,758,796 A | 6/1998 | Nishimura et al. | |

(Continued)

FOREIGN PATENT DOCUMENTS

EP 0 666 450 A1 1/1995

(Continued)

OTHER PUBLICATIONS

Health & Safety Executive, Specification for Welded Steel Non Refillable Transportable Pressure Receptacles, Dot 39 (HSE) Issue 1, Jan. 2000.

(Continued)

*Primary Examiner*—Anthony D. Stashick
*Assistant Examiner*—Harry A Grosso
(74) *Attorney, Agent, or Firm*—Edwards Angell Palmer & Dodge LLP; Scott D. Wofsy

(57) ABSTRACT

A pressure vessel with a protective jacket disposed thereon, wherein the vessel is formed of a metal liner surrounded by a layer of thermoplastic composite filament winding and a protective jacket disposed thereon that facilitates stacking and portability of the vessel, while also providing sufficiently sized openings for visual inspection of the composite layer integrity.

17 Claims, 5 Drawing Sheets

U.S. PATENT DOCUMENTS

| | | |
|---|---|---|
| 6,015,065 A | 1/2000 | McAlister |
| 6,022,435 A | 2/2000 | Palazzo |
| 6,135,308 A | 10/2000 | Fang |
| 6,189,723 B1 | 2/2001 | Davis et al. |
| 6,386,384 B1 | 5/2002 | Chohfi et al. |
| 6,401,963 B1 | 6/2002 | Seal et al. |
| 6,460,721 B2 | 10/2002 | Bowen et al. |
| 6,651,307 B2 | 11/2003 | Portmann |
| 2003/0111473 A1 | 6/2003 | Carter et al. |
| 2005/0001394 A1* | 1/2005 | Gibby .................... 280/47.26 |

FOREIGN PATENT DOCUMENTS

| | | |
|---|---|---|
| WO | WO 97/17570 | 5/1997 |
| WO | WO 00/66939 | 11/2000 |
| WO | WO 01/57429 A1 | 8/2001 |
| WO | WO 03/029718 A1 | 4/2003 |

OTHER PUBLICATIONS

International Search Report dated Aug. 3, 2006.

* cited by examiner

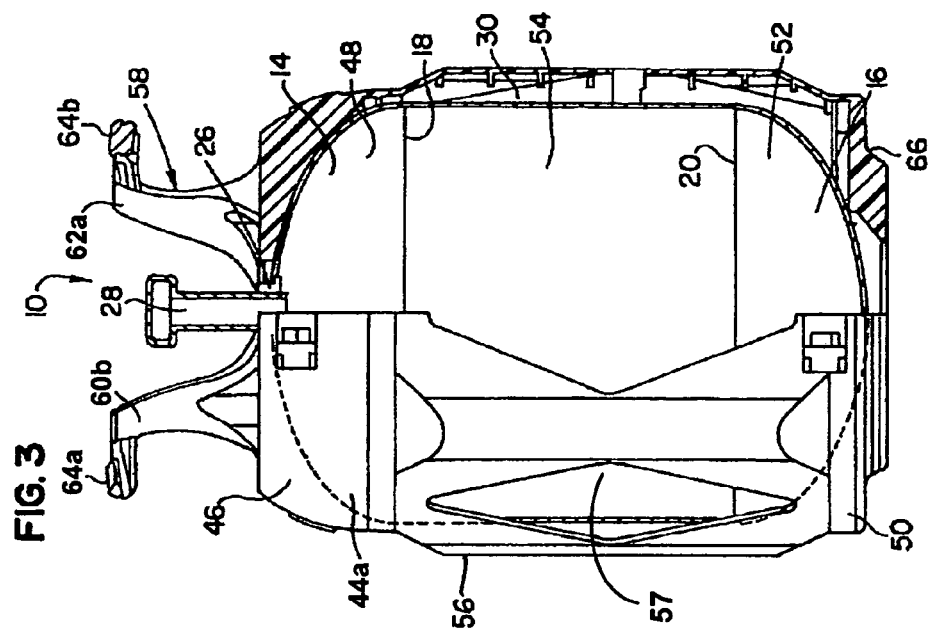
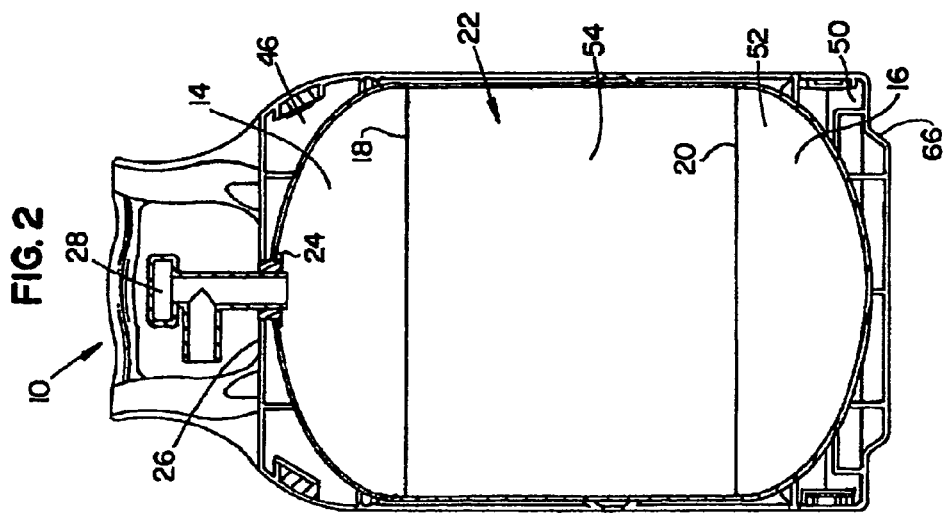

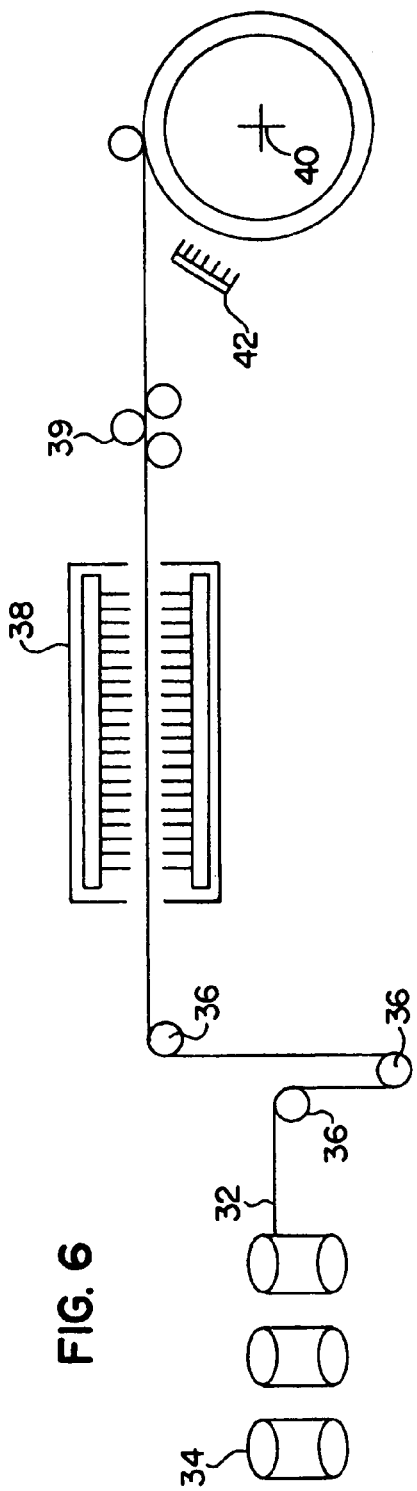
FIG. 6
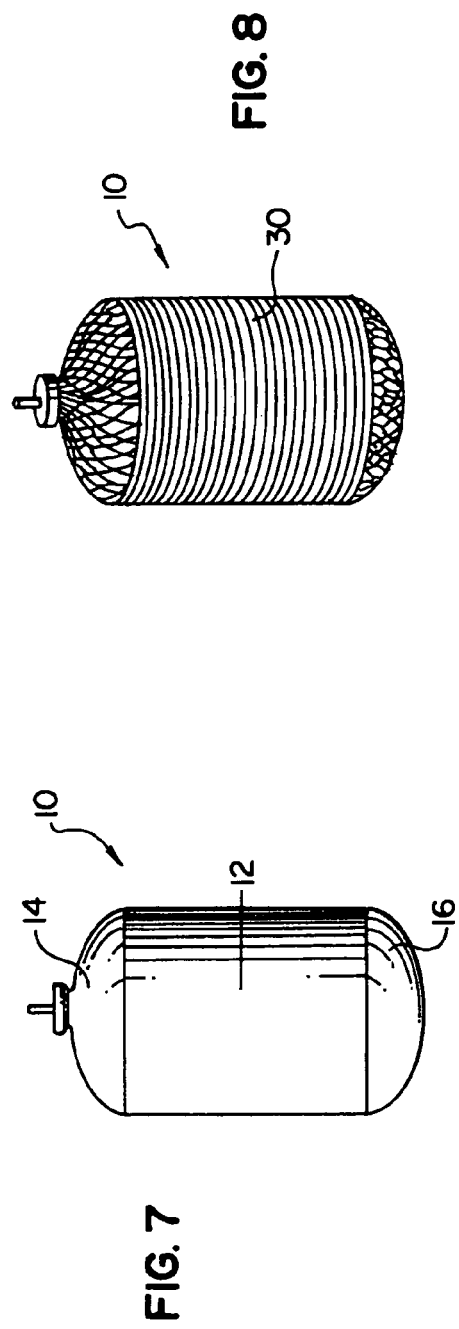
FIG. 8
FIG. 7

HYBRID PRESSURE VESSEL WITH SEPARABLE JACKET

CROSS-REFERENCE TO RELATED APPLICATIONS

This application claims the benefit of priority from U.S. Provisional patent application Ser. No. 60/564,776, filed Apr. 23, 2004.

BACKGROUND OF THE INVENTION

1. Field of the Invention

The subject invention is directed to pressure vessels, and more particularly to a hybrid pressure vessel formed of an inner liner and outer composite layer with a protective jacket disposed thereon.

2. Background of the Related Art

Pressure vessels come in all sizes and shapes, and are made from a variety of materials. The need for light weight pressure vessels has existed and still exists as there have been many attempts to make light weight pressure vessels that are able to store fluids under high pressures for long periods of time, maintain structural integrity, sustain repeated pressurization and depressurization, be substantially impermeable and corrosive free and easy to manufacture, among other things.

Increased use of alternative fuels to fuel vehicles, such as compressed natural gas and hydrogen, and the requirement for ever greater fuel range, has created a need for lightweight, safe tanks with even greater capacity and strength. Increasing the capacity and strength of a pressure vessel can be achieved by increasing the amount or thickness of materials used for structural support. However, this can result in a significant increase in the size and/or weight of the vessel, which, among other things, typically increases the cost of the tank due to increased material costs and the costs associated with transporting the heavier vessels.

Clearly, there is a need in the art for a lightweight pressure vessel that is impermeable, corrosive free and can handle the increasing capacity and pressure demands. Furthermore, there is a need for a method of forming this pressure vessel so it can be sold at a competitive price.

SUMMARY OF THE INVENTION

The subject invention is directed to a unique pressure vessel, which satisfies the aforementioned needs in the art, among other things. In accordance with the subject invention, the thickness of the liner and outer layer are minimized to reduce the cost associated with vessel production without compromising the vessel strength or making the vessel unsuitable for its intended use, particularly with respect to any applicable regulatory standards, such as those promulgated by the Department of Transportation. Thus, the liner and outer layer of the present invention are advantageously optimized by, among other things, a planning process that includes balancing material and production cost versus vessel integrity.

In particular, the present invention provides a pressure vessel with protective jacket that includes a vessel formed by an inner tank defining an upper end portion and a lower end portion, and an outer reinforcing layer disposed on the inner tank. The outer reinforcing layer is fabricated of a thermoplastic material, preferably polypropylene, commingled with glass fibers. A protective jacket configured and dimensioned to engage the vessel is disposed thereon. The protective jacket includes an upper support rim, a lower support rim and a plurality of longitudinal ribs connecting the upper support rim and lower support rim, and a handle protruding from the upper support rim. The protective jacket may be separable into at least two sections.

Preferably, the inner tank is formed of a material having a higher modulus of elasticity and a lower elastic strain limit than the material used to form the outer reinforcing layer.

Preferably, the lower support rim includes a bottom portion disposed over the lower end portion of the vessel, which preferably further includes an inner shoulder. The protruding handle can include a support structure for forming a non-permanent engagement with the bottom portion of the lower support rim.

The present invention is also directed to a method of manufacturing a pressure vessel with protective jacket comprising the steps of securing a first endcap and a second endcap to an inner liner to form a tank, heating glass filaments, commingling the filaments with a thermoplastic material, winding the thermoplastic material and commingled filaments onto the tank while heating to form a vessel, and attaching a protective jacket to the vessel, where the protective jacket includes an upper support rim, a lower support rim and a plurality of longitudinal ribs connecting the upper support rim and lower support rim, and a handle protruding from the upper support rim.

These and other aspects of the pressure vessel of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to make and use the pressure vessel with protective jacket of the present invention, embodiments thereof will be described in detail hereinbelow with reference to the drawings, wherein:

FIG. 2 is a partial cross section view of the pressure vessel with protective jacket shown in FIG. 1;

FIG. 3 is another partial cross-section view of the pressure vessel with protective jacket shown in FIG. 1, illustrating the separable sections of the jacket;

FIG. 6 is a schematic view of an exemplary process for forming a pressure vessel with protective jacket in accordance with the present invention;

FIG. 7 is a front view of a tank constructed in accordance with the present invention prior to the outer layer being disposed thereon; and FIG. 8 is a front view of the tank shown in FIG. 7 after the outer layer has been applied thereon.

DETAILED DESCRIPTION OF PREFERRED EMBODIMENTS

Figure 1:
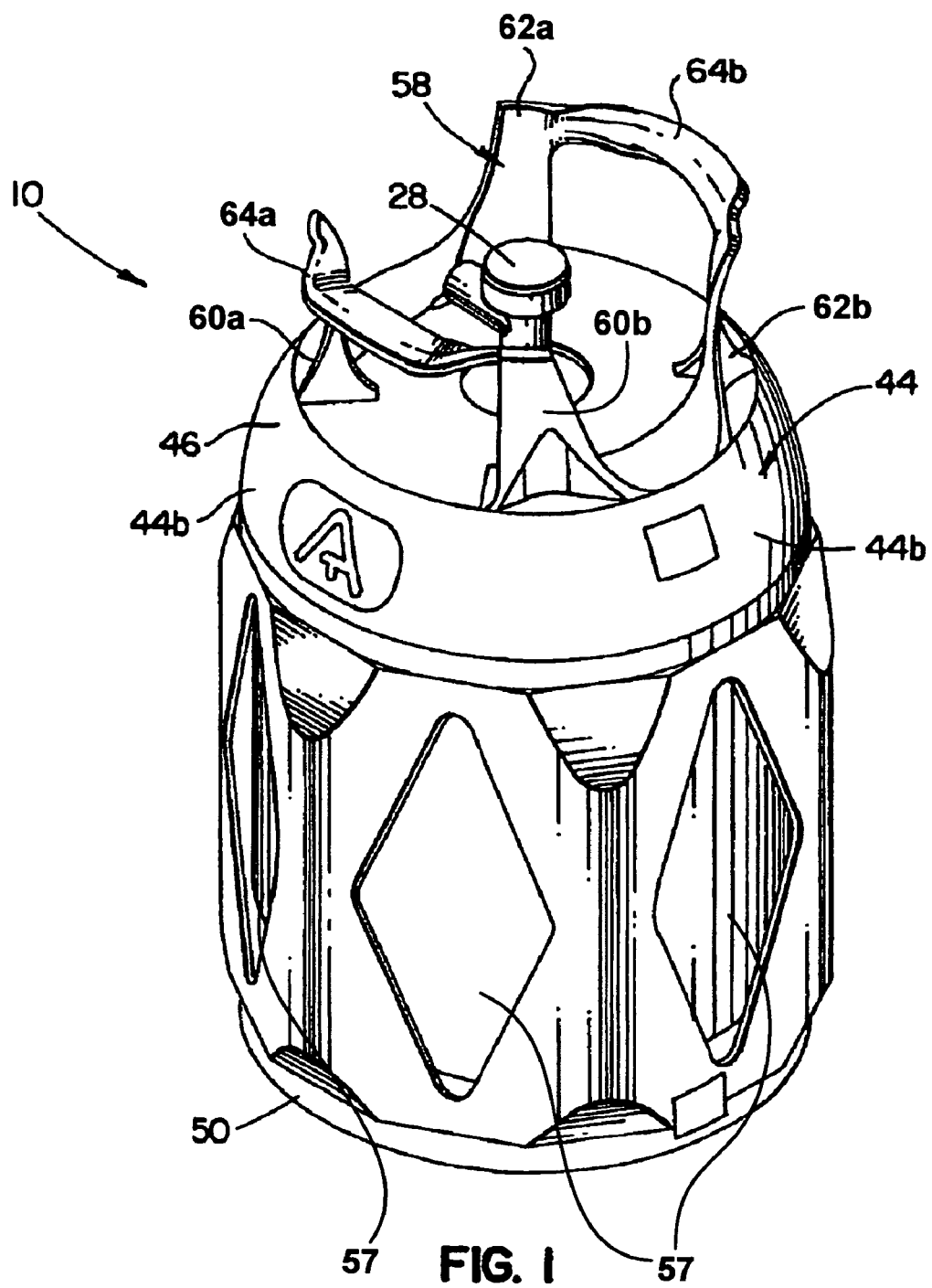
FIG. 1 is a perspective view of a pressure vessel with protective jacket constructed in accordance with a preferred embodiment of the subject invention.
Figure 4:
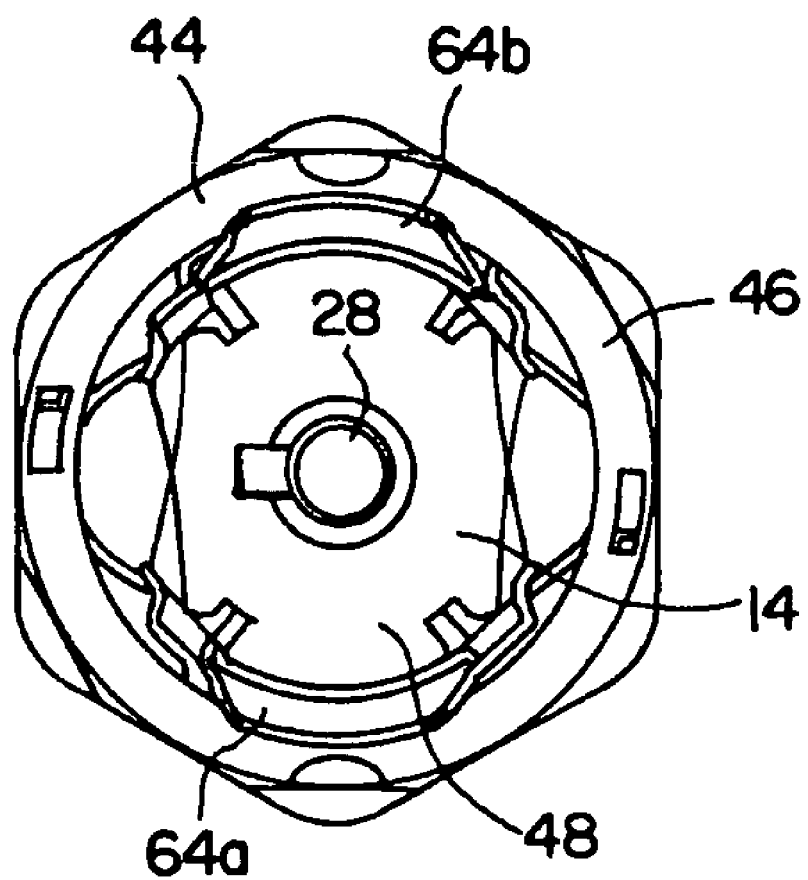
FIG. 4 is a top view of the pressure vessel with protective jacket shown in FIG. 1.
Figure 5:
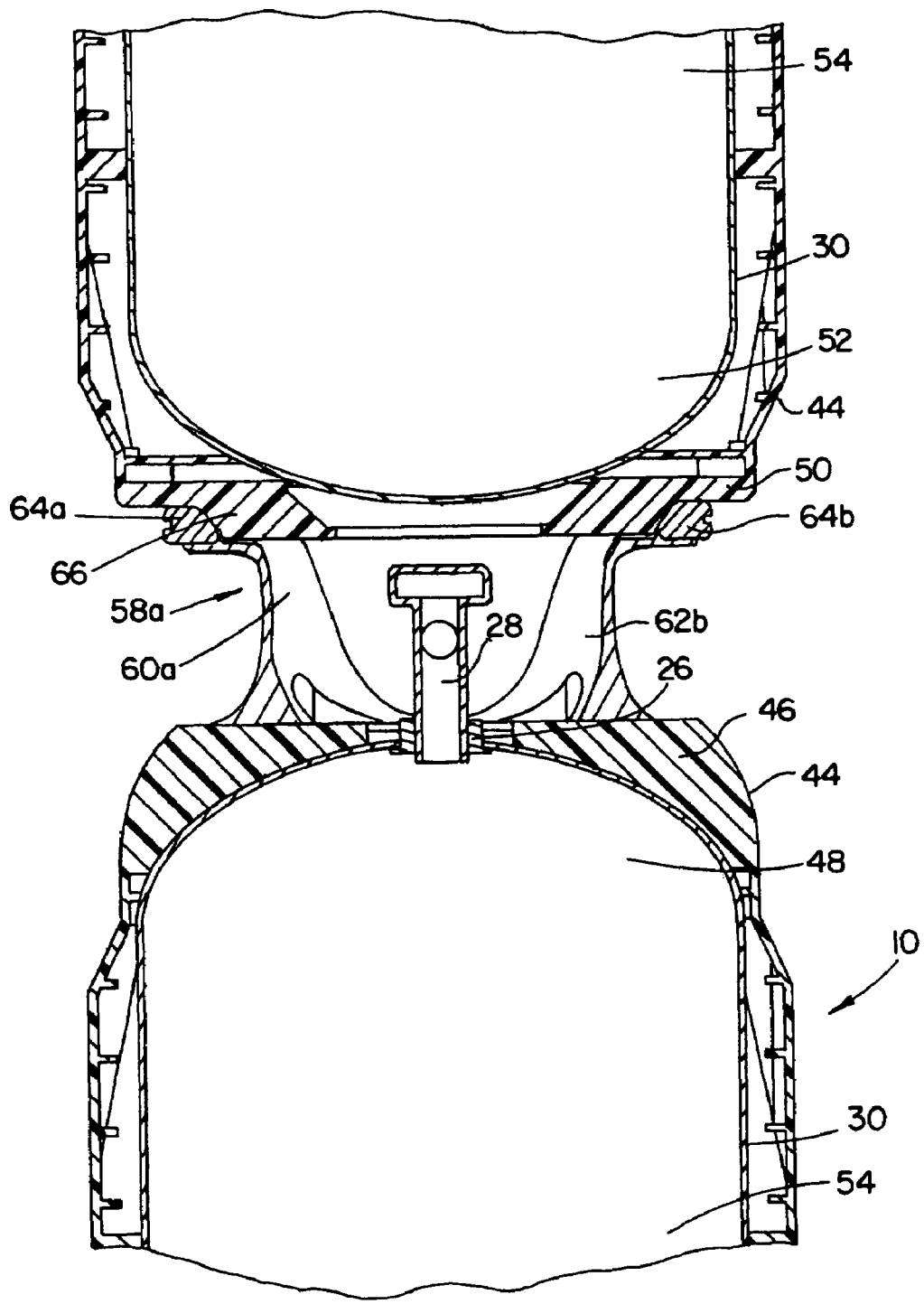
FIG. 5 is a partial cross-section view taken of more than one pressure vessel with protective jackets shown in FIG. 1 stacked together.

Referring now to the drawings wherein like reference numerals identify similar aspects and/or features of the subject invention there is illustrated in FIGS. 1-5 a pressure vessel 10 configured in accordance with a preferred embodiment of the subject invention and designated generally by reference numeral 10. A pressure vessel constructed in accordance with the present invention is suitable applications including, but not limited to, storing propane, refrigerant gas, and liquids or gases at low or high pressure.

Pressure vessel 10 includes a generally cylindrical inner liner 12, first and second dome-shaped, semi-hemispherical endcaps 14 and 16, respectively. Endcaps 14 and 16 may be of any size or shape, such as frustro-conical or flattened, and may be identical or different. First and second endcaps 14 and 16 are secured to first and second end rims 18 and 20 of inner liner 12, respectively, which may be accomplished by any conventional welding techniques known in the art, such as laser welding. Liner 12 and first and second endcaps 14 and 16 cooperate to define defining a vessel storage cavity 22.

In this embodiment, first endcap 14 includes a central aperture 24 defined therein for receiving a valve boss 26, which is secured to aperture 24 by any conventional welding techniques known in the art. Valve boss 26 is configured to receive a valve fitting assembly 28 therein, and together permits the ingress or egress of fluids to cavity 22.

Preferably, liner 12, first and second endcaps 14 and 16, and valve boss 26 (collectively referred to herein after as the "tank") are constructed of an inert, impermeable and non-corrosive material having a high modulus of elasticity, generally 10 million psi or greater, and a low elastic strain generally ranging from about 0.05% to about 1%. The tank and valve assembly 28 are preferably made of steel, but may also be fabricated of metals such as, but not limited to, aluminum, steel, nickel, titanium, platinum, or any other material which would provide suitable structural support in accordance with the present invention.

A reinforcing layer 30 fabricated of one or more layers of a material having a higher elastic strain limit than that of the material used for the tank is disposed over the tank. Layer 30 can consist of a composite that includes a skeleton that imparts desireable mechanical properties to the composite, such as a high tensile strength, and a matrix of material having high ductility that can bind the composite to render it stiff and rigid, among other things. Layer 30 reinforces and provides impact resistance to vessel 10.

Preferably, the composite material in layer 30 consists of fibers or filaments which are commingled or impregnated with a thermoplastic resin. The impregnated filaments may consist of, but are not limited to, combinations of glass, metal, aramid, carbon, graphite, boron, synthetics, resins, epoxies, polyamides, polyoelfins, silicones, and polyurethanes, among other things. Preferably, the filaments are a composite of thermoplastic resin, such a vinyl epoxy or polypropylene, and glass fiber. The filaments can be formed from a commingled thermoplastic and glass fiber fabric sold as TWINTEX, commercially available from Saint-Gobain Vetrotex America Inc. The outer surface of layer 30 may include an additional layer of gel coating (not shown) or other finishing coatings. Preferably, the composite material used in layer 30 is a recyclable material.

An exemplary method of making vessel 10 in accordance with the present invention is shown in FIG. 6. In this embodiment, glass filaments 32 are drawn from a supply 34 onto tension controlling rollers 36 and heated in oven 38 before being impregnated or commingled with a thermoplastic material, such as polypropylene, supplied by an extruder 39. Filaments 32 are preferably heated to a temperature sufficient to melt the thermoplastic resin, which assists the impregnation process. The tank is supported on a mandrel 40 which preferably rotates the tank while the impregnated filaments are wrapped continuously thereon using a hot wind technique in which the internal layers are heated by heating element 42. Preferably, heating element 42 heats the filaments to a temperature sufficient to melt the impregnated thermoplastic material, which becomes sticky and assists in adhering each layer applied onto the tank. Upon cooling, the thermoplastic impregnated filaments wrapped about the tank consolidate to form layer 30. A gel coating may be applied to layer 30. Valve fitting assembly 28 is secured to valve boss 26 to form vessel 10.

In accordance with the present invention, the advantages of the materials selected for liner 12, endcaps 14 and 16 and layer 30 are optimized in that the materials used to construct vessel 10 and amount or thickness thereof are advantageously selected based on achieving a desired structural integrity (e.g., capable of withstanding repeated pressurizations and depressurizations at pressures ranging from about 0 psi to about 10,000 psi without leaking fluid stored therein), while also minimizing the expense and weight of vessel 10. FIG. 7 illustrates liner 12, with endcaps 14 and 16 secured thereto without outer layer 30 disposed thereon and FIG. 8 illustrates vessel 10 after application of outer layer 30 in an exemplary configuration.

In the preferred embodiment, a protective jacket 44 having an upper support rim 46 disposed substantially about the periphery of an upper portion 48 of the tank and a lower support rim 50 disposed substantially about the periphery of a lower portion 52 of the tank to form vessel 10. Upper and lower support rims 46 and 50 are preferably configured to fit onto the tank to restrict movement of the tank within the confines of protective jacket 44. Protective jacket 44 is preferably constructed of a rigid, lightweight material, such as a hard plastic.

Upper support rim 46 is connected with lower support rim 50 by a plurality of longitudinal ribs 56 disposed substantially adjacent a middle portion 54 of vessel 10. Preferably, and as shown in this embodiment, longitudinal ribs 56 are of thickness and spaced apart in a configuration to provide gaps 57 that permit visual inspection of reinforcement layer 30.

Upper support rim 46 includes a handle 58 configured to permit access to valve fitting assembly 28. Preferably, handle 58 is ergonomically designed to assist transport of vessel 10. In the embodiment shown herein, handle 58 includes substantially symmetrical protruding support arms 60a,b and 62a,b. Support arms 60a,b are connected at distal ends thereof by gripping bar 64a, and support arms 62a,b are connected at distal ends thereof by gripping bar 64b, respectively.

Preferably, protective jacket 44 is configured to separate longitudinally into half sections 44a and 44b. Half sections 44a and 44b may be held together by any conventional engagement, such as snap-fitting portions, or other corresponding non-permanent connections, and disengaged accordingly.

Preferably, handle 58 is configured to form a non-permanent engagement with lower support rim 50 to facilitate transporting and stacking a plurality of vessels 10. In this embodiment, gripping bars 64a and 64b are curved and configured to fit about the outer periphery of an inner shoulder 66 defined on lower support rim 50 to form an engagement.

Although the pressure vessel of the subject invention has been described with respect to a preferred embodiment, those skilled in the art will readily appreciate that changes and modifications may be made thereto without departing from the spirit and scope of the subject invention as defined by the appended claims.

What is claimed is:

1. A pressure vessel with protective jacket comprising:
   a) a vessel including an inner tank defining an upper end portion and a lower end portion, and an outer reinforcing layer disposed on the inner tank; and
   b) a protective jacket configured and dimensioned to engage the vessel, the protective jacket including an upper support rim engaging the upper end portion of the inner tank, a lower support rim engaging the lower end portion of the inner tank and a substantially radially outward facing wall connecting the upper support rim and lower support rim, the wall defining at least one radially outward facing gap therein to permit direct visual inspection of the outer reinforcing layer;
   wherein the at least one gap defined in the substantially radially outward facing wall is disposed substantially midway between the upper support rim and the lower support rim.

2. A pressure vessel with protective jacket as recited in claim 1, wherein a wall of the inner tank includes a material having a higher modulus of elasticity and a lower elastic strain limit than the material of the outer reinforcing layer.

3. A pressure vessel with protective jacket as recited in claim 1, wherein the protective jacket is separable into at least two sections.

4. A pressure vessel with protective jacket as recited in claim 1, wherein the lower support rim further includes a bottom portion disposed over the lower end portion of the vessel.

5. A pressure vessel with protective jacket as recited in claim 4, further comprising a handle protruding from the upper support rim that is configured and adapted to form a non-permanent mating engagement with the bottom portion of the lower support rim of another pressure vessel when stacking multiple pressure vessels.

6. A pressure vessel with protective jacket as recited in claim 1, wherein the outer reinforcing layer is fabricated of a thermoplastic material commingled with glass fibers.

7. A pressure vessel with protective jacket as recited in claim 6, wherein the thermoplastic material includes polypropylene.

8. A pressure vessel with protective jacket as recited in claim 1, wherein the inner tank comprises a substantially cylindrical inner liner defining first and second rims and opposing dome shaped first and second endcaps secured to the first and second rims of the inner liner.

9. A pressure vessel with protective jacket as recited in claim 8, wherein the inner tank has an aperture for receiving a valve boss therein.

10. A pressure vessel with protective jacket as recited in claim 9, wherein the valve boss is configured to receive a valve fitting assembly for controlling the ingress and egress of fluids.

11. A pressure vessel with protective jacket as recited in claim 1, wherein a wall of the inner tank includes a metallic material.

12. A pressure vessel with protective jacket as recited in claim 11, wherein the metallic material is selected from the group consisting of steel, aluminum, nickel, titanium, and platinum.

13. A pressure vessel with protective jacket as recited in claim 1, further comprising longitudinal ribs disposed in the wall, wherein the longitudinal ribs define the at least one gap therebetween.

14. A pressure vessel with protective jacket as recited in claim 1, wherein the inner tank has an aperture for receiving a valve boss therein.

15. A pressure vessel with protective jacket as recited in claim 14, wherein the valve boss is configured to receive a valve fitting assembly for controlling the ingress and egress of fluids.

16. A pressure vessel with protective jacket as recited in claim 1, wherein the tank is fabricated substantially of a metal that is corrosion resistant.

17. A pressure vessel with protective jacket as recited in claim 16, wherein the metal is selected from the group consisting of steel, aluminum, nickel, titanium, and platinum.

* * * * *